United States Patent [19]
Bergmann et al.

[11] Patent Number: 5,872,436
[45] Date of Patent: Feb. 16, 1999

[54] SYSTEM FOR MONITORING AND CONTROLLING THE OPENING AND CLOSING OF ELECTRICALLY DRIVEN DEVICES

[75] Inventors: Eduard Bergmann, Ludenscheid; Norbert Horst, Dortmund; Volker Pretzlaff, Iserlohn, all of Germany

[73] Assignee: Leopold Kostal GmbH & Co. KG, Germany

[21] Appl. No.: 732,418

[22] PCT Filed: Feb. 22, 1996

[86] PCT No.: PCT/EP96/00738

§ 371 Date: Mar. 10, 1997

§ 102(e) Date: Mar. 10, 1997

[87] PCT Pub. No.: WO96/27229

PCT Pub. Date: Sep. 6, 1996

[30] Foreign Application Priority Data

Mar. 1, 1995 [DE] Germany ................ 195 07 137.9

[51] Int. Cl.⁶ ........................................ H02P 7/20
[52] U.S. Cl. ................ 318/286; 318/283; 318/287; 318/466; 318/467
[58] Field of Search .................... 318/138, 139, 318/243–296, 442, 444, 445, 446, 464–469; 49/28, 30, 26; 388/823, 903, 909

[56] References Cited

U.S. PATENT DOCUMENTS

| | | | |
|---|---|---|---|
| 4,468,596 | 8/1984 | Kinzl et al. | 318/287 |
| 4,686,598 | 8/1987 | Herr | 318/286 |
| 5,404,673 | 4/1995 | Takeda et al. | 318/468 |
| 5,422,551 | 6/1995 | Takeda et al. | 318/265 |
| 5,436,539 | 7/1995 | Wrenbeck et al. | 318/265 |
| 5,530,329 | 6/1996 | Shigematsu et al. | 318/469 |
| 5,539,290 | 7/1996 | Lu et al. | 318/565 |
| 5,543,693 | 8/1996 | Janca et al. | 318/283 |
| 5,585,702 | 12/1996 | Jackson et al. | 318/266 |
| 5,585,705 | 12/1996 | Brieden | 318/467 |
| 5,596,253 | 1/1997 | Mizuta et al. | 318/469 |
| 5,616,997 | 4/1997 | Jackson et al. | 318/467 |

*Primary Examiner*—Paul Ip
*Attorney, Agent, or Firm*—Brooks & Kushman P.C.

[57] ABSTRACT

A system for monitoring and controlling the opening and closing of an electrically driven device, such as a window or a sliding roof of an automobile, contains various mechanical components and is equipped with an electrical servo motor which can be controlled by operating elements and a sensor device which are connected to an electronic control unit that processes signals under safety aspects and to which a power semiconductor is connected. To minimize the forces exercised on any trapped object, the rating of the servo motor is controlled by the power semiconductor so that the regulating speed of a servotransmission of the device can be adjusted during its adjustment range in dependence on specified positions of the device.

9 Claims, 1 Drawing Sheet

SYSTEM FOR MONITORING AND CONTROLLING THE OPENING AND CLOSING OF ELECTRICALLY DRIVEN DEVICES

TECHNICAL FIELD

This invention relates to a system for avoiding excessive danger to persons in the vicinity of electrically driven devices, such as windows, as a result of limbs being caught during closing operations of the device.

BACKGROUND ART

DE 31 36 746 C2 discloses an electronic control unit pertaining to a device which can be influenced by control elements and by a sensor device. Dependent measured values are continually transmitted to the electronic control unit from the sensor device, e.g., the number of turns or the opening or closing speed of the adjustable device component or the pertaining servo motor, and these values are subjected to a sector-related evaluation.

Specifically, this means that there is no monitoring in the first sector ranging from the completely open to the approximately half-open status of the device. In a second sector which ranges from the approximately half-open to the almost completely closed status of the device, the previously mentioned monitoring is carried out which is directed at the safety aspect. This sector could of course be extended to include the former sector without additional circumstance, in the event that the same safety level were required for the first sector.

No monitoring takes place in a third (rather small) sector ranging from the almost completely closed status to the completely closed status of the device and pertaining to the arrival of the adjustable device component at the sealing arrangement provided at that location. This is due to the fact that no further danger to parts of the body can arise in this sector.

With a device designed in this manner, the problem arises that the servo motor or its rating must be conceived in such a way that the mechanical resistances are overcome which arise over the adjustment range, e.g., as the result of constructive design of the device or externally caused mechanical resistances. In consequence, this means that the servo motor must be designed with a much higher rating than is necessary for the need required for the greater part of the moving travel. As a result, however, the problem arises that limbs can be trapped with an irrelatively great power/travel ratio by the moving device.

DE 37 28 008 A1 makes known an actuating device for movable parts for closing and opening apertures in which it is possible to alter the number of turns of the servo motor, and consequently the speed of the movable parts. However, no reference can be derived from this to a position-related effect on the number of turns for the purpose of limiting the force exercised in the case of trapped objects. On the contrary, it is emphasized that the turning moment, i.e., the force is maintained even when the number of turns is reduced.

SUMMARY OF THE INVENTION

It is an object of the present invention, therefore, to restrict the force exercised by the moving to a device to a minimum at critical areas of the moving travel.

In accordance with the invention, the object is solved by providing a system for monitoring and controlling an electrically driven device movable within an adjustment range. The adjustment range includes first and second sectors. The first sector ranges from a partially open to a mainly closed status of the device. The second sector ranges from the mainly closed to an almost completely closed status of the device.

The system includes a variable rated servo motor for moving the device in the adjustment range such that the device has a given velocity and a given force during movement in the adjustment range. A position sensor generates a position signal indicative of the position of the device in the adjustment range. An electronic control unit is operable to receive the position signal and determine the position of the device in the adjustment range. The electronic control unit is further operable to lower the rating of the servo motor upon a transition of the device from the first to the second sector thereby lowering the velocity and the force of the device to minimize damage to an object trapped by the device in the second sector.

The advantage of such a method of procedure is that the entire regulating range is extremely sensitive regarding the regulating speed and can therefore be optimized relating to the force exercised on trapped objects.

BRIEF DESCRIPTION OF THE DRAWING

Other objects, features and advantages of the present invention will be apparent from studying the written description and the drawing in which.

BEST MODE FOR CARRYING OUT THE INVENTION

Figure 1:
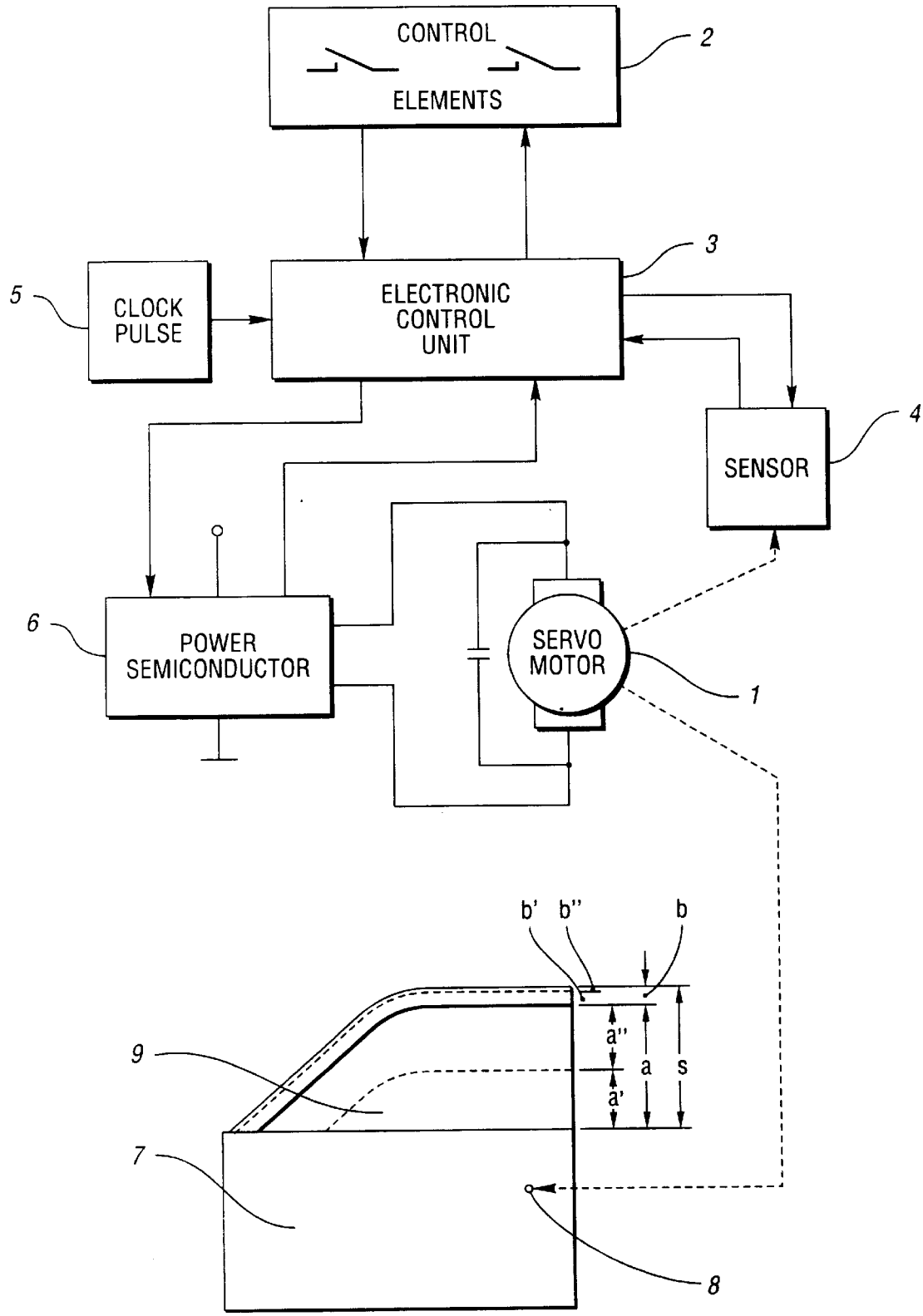
FIG. 1 is a schematic diagram of the system of the present invention.

As illustrated in the drawing, the electrically driven device is represented by a window opening system which is positioned in the door of a vehicle 7 and equipped with an electrical servo motor 1 which moves the device pane 9 (window) to be regulated by way of a servotransmission 8, which is only briefly mentioned, and consequently opens or closes the device pane 9 (window). The device includes the device pane 9 to be regulated and a stationary device component (window frame). The electrical servo motor 1 is connected for this purpose by way of the regulating step of a power semiconductor 6 to the voltage supply (in-vehicle wiring) which is attached to the clock-pulse-influenced 5 electronic control unit 3 which pertains to the operating or control elements 2 and to a sensor device 4. In this way, the electronic control unit 3, and consequently the servo motor 1, can be controlled directly by the control elements 2 and indirectly by the sensor device 4 due to regulating parameters which causally pertain to the window opening system.

The entire adjustment range, s, of the window pane 9 is divided into two regulating sectors a,b of which one sector a, ranging from the completely open to a mainly closed status of the window is to be regarded as a so-called prime safety area. Within this regulating sector a, and based on a so-called first measured value which is to be continuously modified if necessary, it is to be verified by continual monitoring whether a limit value which is formed from this measured value and takes statistical and dynamic values into account is exceeded by subsequently detected measured values. If this is the case, a so-called hazard opening operation of the window is initiated by way of the electronic control unit 3 consisting preferably of a microcomputer, i.e. the electrical servo motor 1 is switched off and subsequently driven in the opposite direction, so that the window is reopened, whereby the opening distance can then be selected at random.

Sector a can be divided into two sections a',a", where in section a' of the window status ranging from completely open to approximately half-open, there is no safeguard against cases of trapped objects in the previously mentioned sense due to the fact that the danger of catching limbs can be excluded in this section with a more or less great degree of probability. In section a", however, procedures are as described above, meaning that in the case of trapped objects, the servo motor is switched off and, if necessary, a so-called hazard opening operation of the window takes place.

During transition from sector a to sector b, it is preferable that the rating of the servo motor 1 is lowered by pulse width modulation of the supply voltage and the regulating speed consequently reduced. As a result, the momentum prevailing in the system is reduced so that the system can react with lower forces to any trapped objects with otherwise unaltered sensory mechanisms and given mechanical parameters. The transition point between sectors a and b is positioned at a distance of about 25 mm from the completely closed status of the device.

Sector b can of course also be divided into two sections b', b" where safety is assured in section b'—where it is still possible for fingers to be trapped—whilst in section b" which pertains to the arrival of the window pane in the sealing arrangement cooperating with the same, the safety aspect is not incorporated due to lack of relevance. In this sector, trapping of fingers or other parts of the body cannot occur. It must, however, be assured that the window is completely closed, entailing greater force expenditure due to the sealing means involved, which is contrary to the above-mentioned safety criteria.

While the best mode for carrying out the invention has been described in detail, those familiar with the art to which this invention relates will recognize various alternative designs and embodiments for practicing the invention as defined by the following claims.

What is claimed is:

1. A system for monitoring and controlling an electrically driven device movable within an adjustment range, the adjustment range includes first and second sectors, the first sector ranging from a partially open to a mainly closed status of the device, and the second sector ranging from the mainly closed to an almost completely closed status of the device, the system comprising:

a variable rated servo motor for moving the device in the adjustment range, the device having a given velocity and a given force during movement in the adjustment range;

a position sensor for generating a position signal indicative of the position of the device in the adjustment range; and an electronic control unit operable to receive the position signal and determine the position of the device in the adjustment range, the electronic control unit being further operable to lower the rating of the servo motor upon a transition of the device from the first to the second sector, thereby lowering the velocity and the force of the device to minimize damage to an object trapped by the device in the second sector.

2. The system as recited in claim 1 wherein the servo motor has a power value and a voltage value and the electronic control unit controls the rating of the servo motor by changing the voltage value based on the position of the device.

3. The system as recited in claim 2 further comprising a power semiconductor device coupled between the electronic control unit and the servo motor for controlling the rating of the servo motor.

4. The system as recited in claim 3 wherein the rating of the servo motor is controlled utilizing pulse width modulation.

5. The system as recited in claim 1 wherein the transition of the device between the first and second sectors is positioned at a distance of about 25 mm from the completely closed status of the device.

6. The system as recited in claim 1 further comprising a power semiconductor device coupled between the electronic control unit and the servo motor for controlling the rating of the servo motor.

7. The system as recited in claim 6 wherein the rating of the servo motor is controlled utilizing pulse width modulation.

8. The system as recited in claim 1 wherein the electronic control unit is further operable to raise the rating of the servo motor upon a transition of the device from the second to the first sector, thereby raising the velocity of the device.

9. The system as recited in claim 1 wherein the electronic control unit is further operable to process the position signal to determine if an object is trapped by the device, and upon determining that an object is trapped by the device the electronic unit controls the servo motor to reverse the movement direction of the device.

* * * * *